United States Patent
Kakinuma et al.

(10) Patent No.: US 11,318,982 B2
(45) Date of Patent: May 3, 2022

(54) STEERING COLUMN DEVICE AND MANUFACTURING METHOD FOR THE SAME

(71) Applicant: JTEKT CORPORATION, Osaka (JP)

(72) Inventors: Hidenori Kakinuma, Iruma-gun (JP); Yasunori Kamitani, Fujimi (JP); Soma Iwai, Sayama (JP); Keiji Kishimoto, Kashiba (JP)

(73) Assignee: JTEKT CORPORATION, Kariya (JP)

( * ) Notice: Subject to any disclaimer, the term of this patent is extended or adjusted under 35 U.S.C. 154(b) by 0 days.

(21) Appl. No.: 17/145,930

(22) Filed: Jan. 11, 2021

(65) Prior Publication Data

US 2021/0221423 A1 Jul. 22, 2021

(30) Foreign Application Priority Data

Jan. 17, 2020 (JP) .............................. JP2020-005996

(51) Int. Cl.
*B62D 1/185* (2006.01)
(52) U.S. Cl.
CPC ........ *B62D 1/185* (2013.01); *B60Y 2410/102* (2013.01)
(58) Field of Classification Search
CPC .......................... B62D 1/185; B60Y 2410/102
See application file for complete search history.

(56) References Cited

U.S. PATENT DOCUMENTS

| | | | | |
|---|---|---|---|---|
| 11,148,706 B2 * | 10/2021 | Breuer | ...................... | F16D 3/06 |
| 2008/0000316 A1 * | 1/2008 | Kurokawa | ............. | B62D 1/192 |
| | | | | 74/493 |
| 2019/0329813 A1 | 10/2019 | Osuka et al. | | |

FOREIGN PATENT DOCUMENTS

| | | | |
|---|---|---|---|
| JP | 2001-322552 A | | 11/2001 |
| JP | 2019-189047 A | | 10/2019 |
| KR | 100559643 B1 | * | 3/2006 |
| KR | 101517078 B1 | * | 5/2015 |
| NL | 8601329 A | * | 2/1987 ............. B62D 1/185 |

* cited by examiner

*Primary Examiner* — Drew J Brown
(74) *Attorney, Agent, or Firm* — Oliff PLC (57) ABSTRACT

A steering column device includes a metal outer-side cylindrical member, a metal inner-side cylindrical member, and a resin intermediate cylindrical member that is disposed between the outer-side cylindrical member and the inner-side cylindrical member. The intermediate cylindrical member has an oil feed orifice through which the semisolid lubricating oil is guided from an outer circumferential face side to an inner circumferential face side when inserting the intermediate cylindrical member into the outer-side cylindrical member.

7 Claims, 7 Drawing Sheets

FIG. 8A (COMPARATIVE EXAMPLE)
FIG. 8B (COMPARATIVE EXAMPLE)
FIG. 8C (COMPARATIVE EXAMPLE)
FIG. 8D (COMPARATIVE EXAMPLE)
FIG. 8E (COMPARATIVE EXAMPLE)

STEERING COLUMN DEVICE AND MANUFACTURING METHOD FOR THE SAME

CROSS-REFERENCE TO RELATED APPLICATION

This application claims priority to Japanese Patent Application No. 2020-005996 filed on Jan. 17, 2020, incorporated herein by reference in its entirety.

BACKGROUND

1. Technical Field

The disclosure relates to a steering column device for rotatably supporting a steering shaft of a vehicle and a manufacturing method of the same, and more particularly relates to a steering column device that has telescopic functions in which the position of a steering wheel is adjusted in the vehicle front-rear direction and a manufacturing method of the same.

2. Description of Related Art

Some steering column devices provided with telescopic functions for adjusting the position of the steering wheel in the vehicle front-rear direction have a resin intermediate cylindrical member disposed between a metal upper tube that serves as an outer-side cylindrical member and a metal lower tube that serves as an inner-side cylindrical member, to facilitate smooth telescopic adjustment by the driver (e.g., see Japanese Unexamined Patent Application Publication No. 2001-322552 (JP 2001-322552 A) and Japanese Unexamined Patent Application Publication No. 2019-189047 (JP 2019-189047 A)).

When performing telescopic adjustment, the fitting length between the upper tube and the lower tube changes as the steering wheel moves in the vehicle front-rear direction. In the arrangement described in JP 2001-322552 A, a bushing serving as an intermediate cylindrical member is integrally mounted to the lower tube, and during telescopic adjustment the inner circumferential face of the upper tube slides over the outer circumferential face of the bushing. Also, in the arrangement described in JP 2019-189047 A, a protrusion is formed on the outer circumferential face of a retainer serving as an intermediate cylindrical member, and this protrusion engages a hole portion of the upper tube, thereby restricting movement of the retainer relative to the upper tube in the axial direction, as well as rotation around the axis.

SUMMARY

In order to perform even smoother telescopic adjustment in the steering column device configured as described above, grease is preferably applied to the surface of the intermediate cylindrical member where sliding occurs (the outer circumferential face in the arrangement described in JP 2001-322552 A, and the inner circumferential face in the arrangement described in JP 2019-189047 A). However, when applying grease to the outer circumferential face of the intermediate cylindrical member, the viscosity of grease increases as the grease shrinks, due to the thixotropy of the grease, and the intermediate cylindrical member increases in diameter and adheres to the upper tube more readily. Also, when applying grease to the inner circumferential face of the intermediate cylindrical member, the intermediate cylindrical member decreases in diameter and adheres to the lower tube more readily, due to the thixotropy of grease in the same way.

When a fixation phenomenon due to this adherence occurs, the steering wheel may not move easily when starting telescopic adjustment, which may give the driver an unnatural or unpleasant sensation. Note that thixotropy is a general nature of semisolid substances of which viscosity becomes lower under application of shearing stress and a liquid state is exhibited, and when the stress is removed the viscosity gradually rises, and a solid state is exhibited.

A conceivable measure to deal with this is to place grease both between the outer circumferential face of the intermediate cylindrical member and the inner circumferential face of the upper tube, and between the inner circumferential face of the intermediate cylindrical member and the outer circumferential face of the lower tube. Placing grease in this way causes force increasing the diameter of the intermediate cylindrical member and force reducing the diameter thereof to cancel each other out, thereby enabling the intermediate cylindrical member to be suppressed from adhering to the upper tube or the lower tube. However, this arrangement involves work of coating the outer circumferential face and the inner circumferential face of the intermediate cylindrical member with grease and performing assembly, which is troublesome, and will lead to increased costs due to poorer work efficiency at the time of manufacturing the steering column device.

Accordingly, the disclosure provides a steering column device regarding which a semisolid lubricating oil can be easily coated on the outer circumferential face and the inner circumferential face of the resin intermediate cylindrical member disposed between the outer-side cylindrical member and the inner-side cylindrical member when manufacturing the steering column device, and a method thereof.

According to a first aspect of the disclosure, a steering column device for supporting a steering shaft such that the steering shaft is rotatable with respect to the steering column device, a steering wheel being linked to the steering shaft, includes a metal outer-side cylindrical member that is relatively movable in an axial direction, a metal inner-side cylindrical member that is relatively movable in the axial direction, and a resin intermediate cylindrical member that is disposed between the outer-side cylindrical member and the inner-side cylindrical member. A semisolid lubricating oil is disposed between an outer circumferential face of the intermediate cylindrical member and the outer-side cylindrical member, and between an inner circumferential face of the intermediate cylindrical member and the inner-side cylindrical member. The intermediate cylindrical member has an oil feed orifice through which the semisolid lubricating oil is guided from an outer circumferential face side to an inner circumferential face side when inserting the intermediate cylindrical member into the outer-side cylindrical member.

According to a second aspect of the disclosure, a manufacturing method for the steering column device includes a first process of coating the inner circumferential face of the outer-side cylindrical member or the outer circumferential face of the intermediate cylindrical member with the semisolid lubricating oil, a second process of inserting the intermediate cylindrical member into the outer-side cylindrical member, and a third process of inserting the inner-side cylindrical member into the inner side of the intermediate cylindrical member that is inserted into the outer-side cylindrical member. The semisolid lubricating oil guided from the outer circumferential face side of the intermediate cylindrical member to the inner circumferential face side in the second process is disposed between the inner circumferential face of the intermediate cylindrical member and the inner-side cylindrical member in the third process.

According to the above aspects, a semisolid lubricating oil can be easily coated on the outer circumferential face and the inner circumferential face of the resin intermediate cylindrical member disposed between the outer-side cylindrical member and the inner-side cylindrical member when manufacturing the steering column device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiment

An embodiment of the disclosure will be described with reference to FIGS. 1 through 7D. Note that the embodiment described below is given as a preferred specific example for carrying out the disclosure. Although there are parts in which various technological matters that are technologically preferable are exemplified in detail, the technical scope of the disclosure is not limited to the specific forms thereof.

Overall Configuration of Steering Column Device

Figure 1:
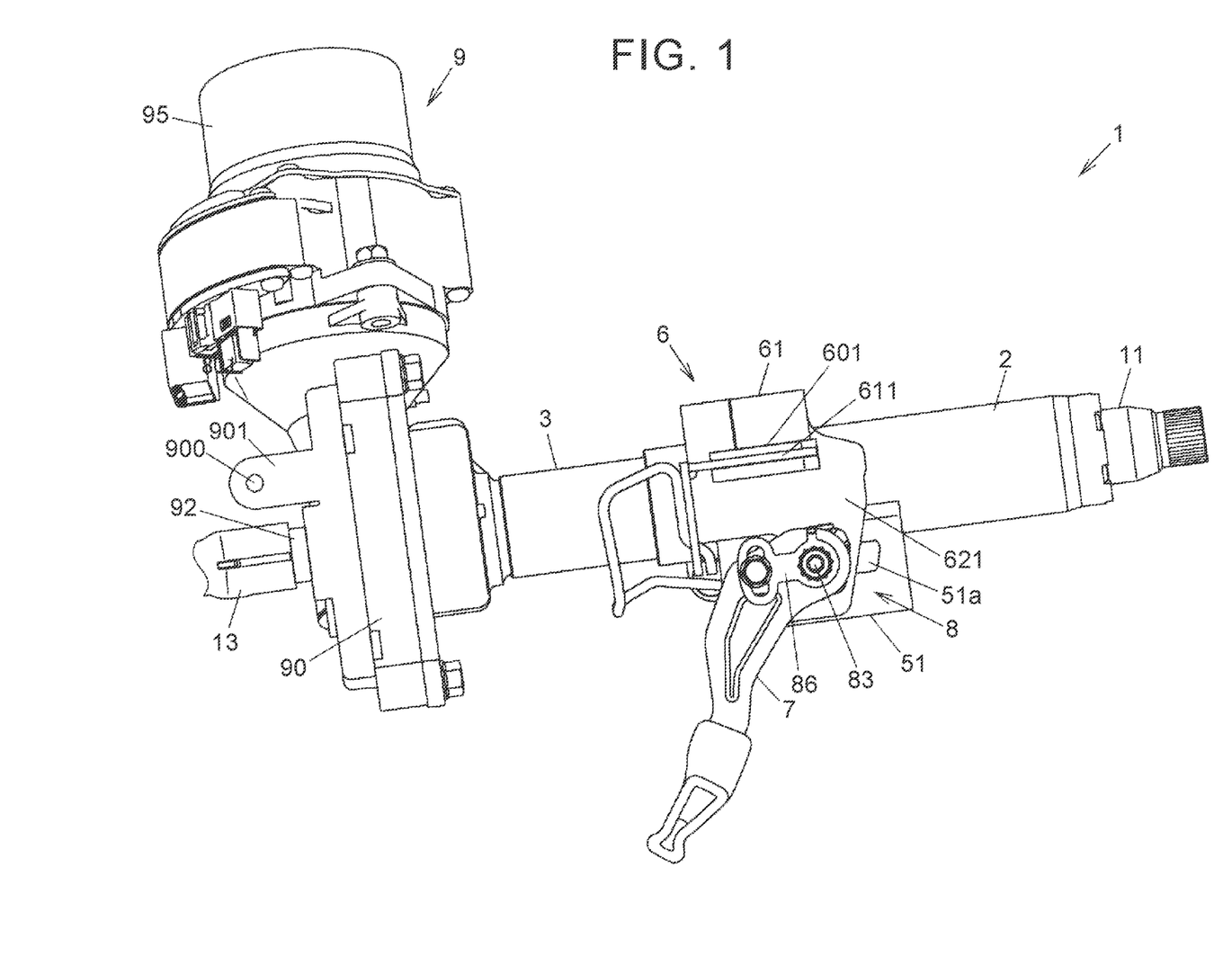
FIG. 1 is an overall view of a steering column device according to an embodiment of the disclosure.
Figure 2:
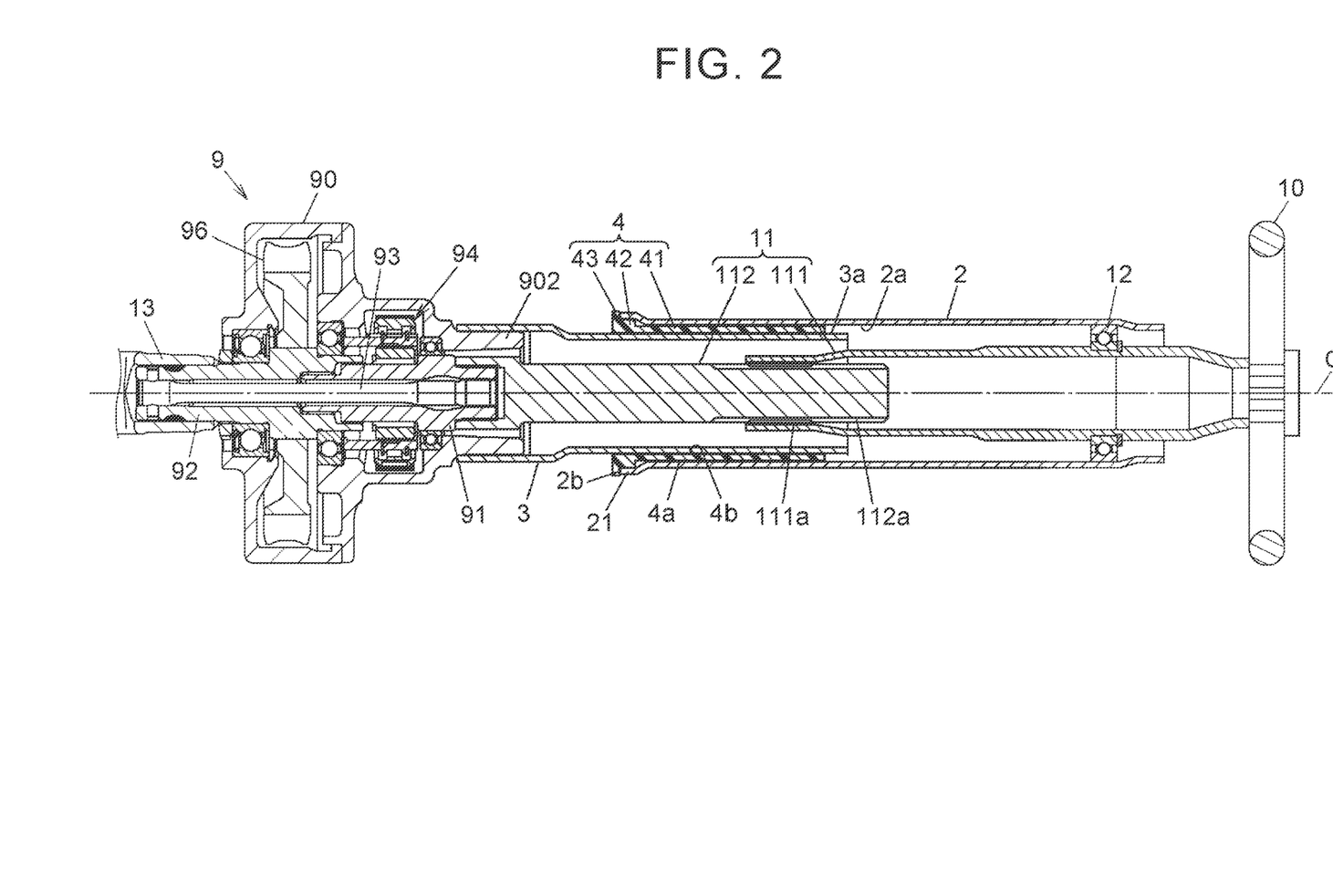
FIG. 2 is a sectional view illustrating a configuration example of the steering column device.
Figure 3:
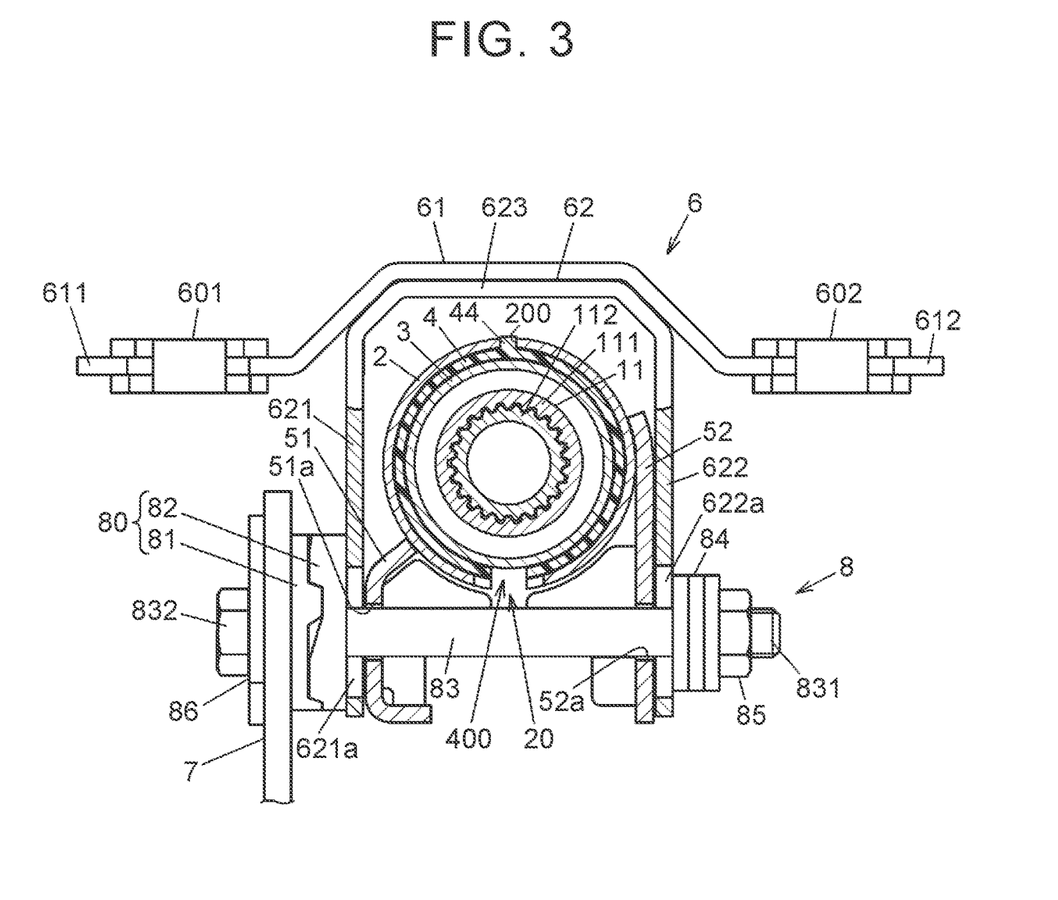
FIG. 3 is a cross-sectional view of the steering column device, taken perpendicular to the axial direction.

FIG. 1 is an overall view illustrating a steering column device according to the embodiment of the disclosure. FIG. 2 is a sectional view illustrating a configuration example of the steering column device. FIG. 3 is a cross-sectional view of the steering column device, taken perpendicular to the axial direction. Note that in the following, "up" and "down" refer to "up" and "down" in the vehicle up-down direction in a state in which the steering column device is installed in a vehicle.

A steering column device 1 is provided for supporting a steering shaft 11, which rotates along with a steering wheel 10, so that the steering shaft 11 is rotatable with respect to the steering column device 1. The steering column device 1 is provided with an upper tube 2 and a lower tube 3 that are formed of metal and are capable of relative movement in the axial direction, a collar 4 that is made of resin and is disposed between the upper tube 2 and the lower tube 3, a first holding plate 51 and a second holding plate 52 that are fixed to the upper tube 2, a bracket 6 that is attached to the vehicle body, a lock lever 7 that is operated by the driver, a clamp mechanism 8 that operates by pivoting of the lock lever 7, and a power-assisted steering device 9 that imparts torque to the steering shaft 11 to assist steering. The upper tube 2, the lower tube 3, and the collar 4 are respective forms of an outer-side cylindrical member, an inner-side cylindrical member, and an intermediate cylindrical member, of the disclosure.

The steering column device 1 is installed in the vehicle, inclined as to the horizontal direction, such that the side thereof to which the steering wheel 10 is attached is higher. The upper tube 2 is disposed higher than the lower tube 3, and accommodates part of the lower tube 3. The upper tube 2 and the lower tube 3 both have cylindrical shapes and are made of metal. The collar 4 is disposed on the inner side of the upper tube 2, at the lower end portion thereof.

When performing telescopic adjustment in which the position of the steering wheel 10 in the vehicle front-rear direction (the right-left direction in FIGS. 1 and 2) is adjusted, the length of fitting between the upper tube 2 and the lower tube 3 changes as the steering wheel 10 moves in the vehicle front-rear direction. The collar 4 is interposed between the upper tube 2 and the lower tube 3 and thereby makes the movement of the upper tube 2 as to the lower tube 3 in the axial direction to be smooth at the time of telescopic adjustment.

The steering shaft 11 has a cylindrical outer shaft 111 that is disposed on the inner side of the upper tube 2 and the lower tube 3, with the steering wheel 10 attached to one end portion thereof, and an inner shaft 112 spline-fit to the outer shaft 111. The outer shaft 111 and the inner shaft 112 integrally rotate with the steering wheel 10, with a rotation axis line O as the center of rotation. The center axis of the upper tube 2 matches the rotation axis line O.

The outer shaft 111 is rotatably supported by the upper tube 2, through a ball bearing 12. An outer circumference spline fitting portion 112a is provided to the inner shaft 112, on the outer circumferential face at the one end portion in the axial direction, at the steering wheel 10 side. This outer circumference spline fitting portion 112a is fit into an inner circumference spline fitting portion 111a of the outer shaft 111. The outer shaft 111 is capable of relative movement as to the inner shaft 112 in the axial direction, over a predetermined range, while maintaining this fit state. An input shaft 91 of the power-assisted steering device 9 is fixed to the other end portion of the inner shaft 112 in the axial direction.

The power-assisted steering device 9 is provided with the input shaft 91 and an output shaft 92, a torsion bar (twisting shaft) 93 disposed between the input shaft 91 and the output shaft 92, a torque sensor 94 that detects steering torque in accordance with the amount of twisting of the torsion bar 93, an electric motor 95 that is supplied with motor current corresponding to the detected steering torque by the torque sensor 94, from a control device that is omitted from illustration, a worm gear mechanism that reduces rotations of the electric motor 95 and transmits the reduced rotations to the output shaft 92, and a housing 90 that accommodates the worm gear mechanism and so forth. A worm wheel 96 of the worm gear mechanism is illustrated in FIG. 2, and this worm wheel 96 meshes with a worm attached to the shaft of the electric motor 95 within the housing 90.

The end portion of the output shaft 92 protruding from the housing 90 forward in the vehicle (the left side in FIGS. 1 and 2) is linked to one end portion of an intermediate shaft via a universal joint, and the other end portion of the intermediate shaft is linked to a pinion shaft via a universal joint. The pinion shaft meshes with rack teeth of a rack shaft that performs advancing and retreating movement in the vehicle width direction, and the front wheels that are steered wheels are steered by the advancing and retreating movement of the rack shaft. FIGS. 1 and 2 illustrate a socket 13 at the output shaft 92 side of the universal joint connecting the output shaft 92 and the intermediate shaft.

A pair of arm portions 901 is provided at the end portion of the housing 90 on the front side in the vehicle front-rear direction, one arm portion 901 of which is illustrated in FIG. 1. An oil feed orifice 900 is formed in each of the arm portions 901, and a support shaft (omitted from illustration) that is attached to a steering member that is a support member on the vehicle body is inserted through the oil feed orifices 900. The housing 90 is supported by this support shaft, and when performing tilt adjustment to adjust the position of the steering wheel 10 in the up-down direction, the housing 90 swings centered on the support shaft.

The end portion of the lower tube 3 on the front side in the vehicle front-rear direction is fixed by fitting to a cylinder portion 902 of the housing 90. The first holding plate 51 and the second holding plate 52 are fixed on the outer circumferential face of the upper tube 2 with a predetermined spacing therebetween in the circumferential direction of the upper tube 2, as illustrated in FIG. 3. A slit 20 extending in the axial direction between the first holding plate 51 and the second holding plate 52 is formed in the upper tube 2. The slit 20 extends from the end face of the upper tube 2 on the front side in the vehicle front-rear direction toward the steering wheel 10 side, over a predetermined range in the axial direction.

The bracket 6 is provided with an attaching stay 61 that has attaching portions 611 and 612 for attaching to the vehicle body at both end portions in the vehicle width direction, and a holder 62 that has a pair of side plates 621 and 622 that sandwiches the first holding plate 51 and the second holding plate 52 in the vehicle width direction and a top plate 623. Capsules 601 and 602 that are removably attached to the attaching stay 61 are attached to the attaching portions 611 and 612 respectively, and these capsules 601 and 602 are fixed to a support member at the vehicle body by bolts, for example.

The clamp mechanism 8 is configured including a cam mechanism 80 that has a first cam member 81 that turns along with the lock lever 7 and a second cam member 82 of which rotation as to the side plate 621 of the bracket 6 is restricted, a tilt bolt 83 that passes through the first cam member 81 and the second cam member 82 in the vehicle width direction and turns along with the lock lever 7, a thrust bearing 84 that makes turning of the tilt bolt 83 smooth, a nut 85 screwed to an external thread 831 of the tilt bolt 83 protruding from the thrust bearing 84, and a washer 86 that engages a bolthead 832 of the tilt bolt 83 and restricts turning of the tilt bolt 83 as to the lock lever 7.

The tilt bolt 83 is inserted through slots 621$a$ and 622$a$ respectively provided in the side plates 621 and 622 of the bracket 6, and slots 51$a$ and 52$a$ respectively provided in the first holding plate 51 and the second holding plate 52. The slots 621$a$ and 622$a$ of the side plates 621 and 622 are formed long in the up-down direction, and the slots 51$a$ and 52$a$ of the first holding plate 51 and the second holding plate 52 are formed long in the vehicle front-rear direction.

When the lock lever 7 is operated in the tightening direction, the first cam member 81 turns as to the second cam member 82, and the second cam member 82 moves toward the nut 85 side along the tilt bolt 83. The clamp mechanism 8 clamps the side plates 621 and 622 of the bracket 6 toward the first holding plate 51 and the second holding plate 52 by operations of the cam mechanism 80. The first holding plate 51 and the second holding plate 52 are clamped and held by the side plates 621 and 622, whereby the upper tube 2 is fixed as to the bracket 6.

On the other hand, when the lock lever 7 is operated in the loosening direction, the tightening by the side plates 621 and 622 is loosened, and the upper tube 2 is capable of moving in the vehicle front-rear direction and the up-down direction as to the bracket 6. Tilt adjustment and telescopic adjustment are performed in this state. When performing tilt adjustment, the tilt bolt 83 moves in the up-down direction of the slots 621$a$ and 622$a$ of the side plates 621 and 622. When performing telescopic adjustment, the tilt bolt 83 moves in the vehicle front-rear direction of the slots 51$a$ and 52$a$ of the first holding plate 51 and the second holding plate 52.

Configuration of Collar 4

Figure 4:
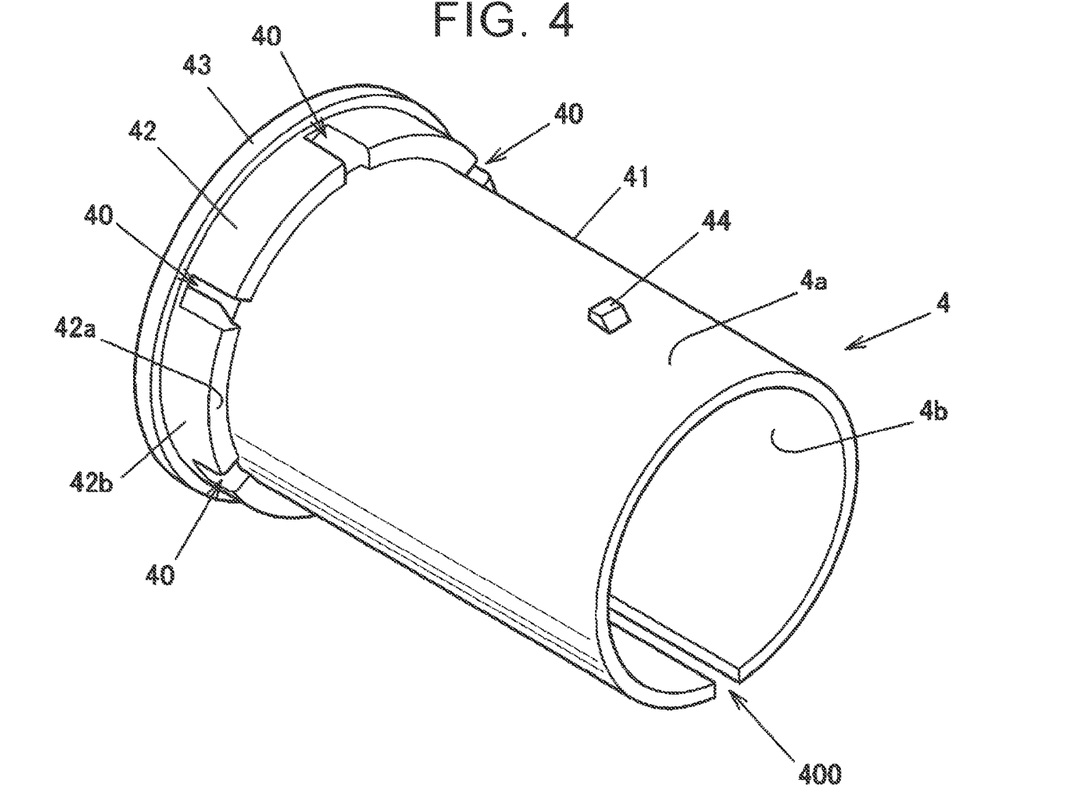
FIG. 4 is a perspective view illustrating a collar.
Figure 5:
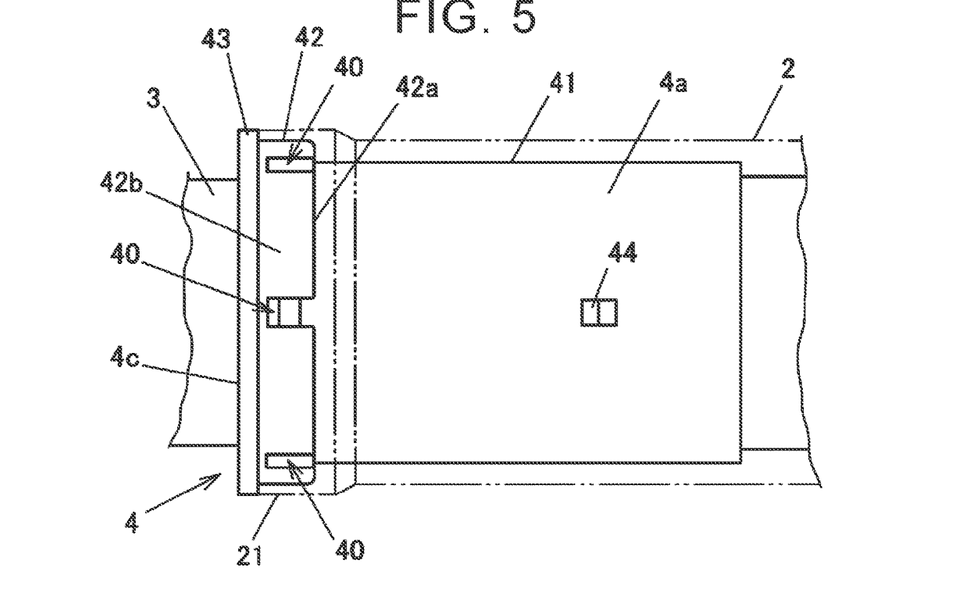
FIG. 5 is an explanatory diagram illustrating an upper tube, a lower tube, and the collar.

Next, the configuration of the collar 4 will be described with reference to FIGS. 4 and 5. FIG. 4 is a perspective view illustrating the collar 4. FIG. 5 is an explanatory diagram illustrating the collar 4 disposed between the upper tube 2 and the lower tube 3, in which the upper tube 2 is illustrated as an imaginary outline (long dashed double-short dashed lines).

The collar 4 integrally has a cylindrical main portion 41, an annular protrusion 42 provided at one end portion in the axial direction, an annular flange portion 43 that has a larger outer diameter than the annular protrusion 42, and a retaining claw 44 protruding outward in the radial direction from the main portion 41, and has an overall cylindrical shape, through which the lower tube 3 is inserted. The annular protrusion 42 is formed protruding outwards in the radial direction from the main portion 41, and the flange portion 43 is formed protruding further outwards in the radial direction from the annular protrusion 42.

Also, the collar 4 has a slit 400 formed over the entire axial direction, with this slit 400 situated communicating with the slit 20 of the upper tube 2, as illustrated in FIG. 3. An engaging hole 200 with which the retaining claw 44 is engaged is formed in the upper tube 2. Rotation and movement in the axial direction of the collar 4 as to the upper tube 2 is restricted by the retaining claw 44 engaging the engaging hole 200.

The collar 4 is inserted into the upper tube 2 from the end portion of the upper tube 2 on the front side in the vehicle front-rear direction. The annular protrusion 42 and the flange portion 43 are provided at the rear end portion of the collar 4 in the direction of insertion into the upper tube 2. A cylindrical expanded portion 21 that accommodates the annular protrusion 42 is provided on the end portion of the upper tube 2 on the front side in the vehicle front-rear direction. The inner diameter and the outer diameter of the expanded portion 21 are larger than the inner diameter and the outer diameter of the upper tube 2 at a portion rearward in the vehicle front-rear direction from the expanded portion 21. The flange portion 43 is disposed outside of the upper tube 2, facing an end face 2b of the expanded portion 21 (see FIG. 2) in the axial direction. The main portion 41 and the annular protrusion 42 of the collar 4 are inserted into the upper tube 2 until the flange portion 43 comes into contact with the end face 2b of the expanded portion 21.

The collar 4 has formed therein oil feed orifices 40 that can guide the semisolid lubricating oil from an outer circumferential face 4a side to an inner circumferential face 4b side when the collar 4 is inserted into the upper tube 2 from the end portion of the upper tube 2 on the front side in the vehicle front-rear direction. In the present embodiment, six oil feed orifices 40 are formed in the collar 4, equidistantly in the circumferential direction, and part of the semisolid lubricating oil coated on the outer circumferential face 4a side is guided to the inner circumferential face 4b side through each of the oil feed orifices 40. The semisolid lubricating oil is disposed between the outer circumferential face 4a of the collar 4 and an inner circumferential face 2a of the upper tube 2, and between the inner circumferential face 4b of the collar 4 and an outer circumferential face 3a of the lower tube 3.

The semisolid lubricating oil is a lubricant formed by dispersing a thickener in a liquid base oil made of a mineral oil or synthetic oil to form a semisolid (gel). Placing the semisolid lubricating oil between the inner circumferential face 4b of the collar 4 and the outer circumferential face 3a of the lower tube 3 makes sliding of the collar 4 and the lower tube 3 smooth when performing telescopic adjustment. Also, placing the semisolid lubricating oil between the outer circumferential face 4a of the collar 4 and the inner circumferential face 2a of the upper tube 2 can suppress a situation where the steering wheel 10 is not readily moved at the time of starting telescopic adjustment due to the earlier-described thixotropy. In the later-described FIGS. 6A through 7D, this semisolid lubricating oil is illustrated as grease G.

The oil feed orifices 40 open to an axial-direction end face 42a of the annular protrusion 42 at the far side (steering wheel 10 side) of the expanded portion 21, and an outer circumferential face 42b of the annular protrusion 42 closer to the upper tube 2 side (forward side in direction of insertion) than the flange portion 43. Next, a manufacturing method of the steering column device 1 using the collar 4 will be described.

Manufacturing Method of Steering Column Device

FIGS. 6A through 6D are explanatory diagrams illustrating the manufacturing method of the steering column device 1. FIGS. 7A through 7D are partially-enlarged views of FIGS. 6A through 6D, respectively. FIGS. 6A through 6D and FIGS. 7A through 7D illustrate sections of the upper tube 2, the lower tube 3, and part of the collar 4, taken along the rotation axis line O.

The oil feed orifices 40 are inclined as to the center axis of the upper tube 2, so that at least a part thereof extends further toward the rear side in the direction of insertion as the oil feed orifices 40 become closer to the inner circumferential face 4b side. In the present embodiment, the oil feed orifices 40 are inclined as to the center axis of the upper tube 2 between the outer circumferential face 42b of the annular protrusion 42 and the inner circumferential face 4b, such that grease G readily flows in the direction of an arrow A in FIG. 7C. Also, in the present embodiment, the oil feed orifices 40 also open to part of an inner radial side of an end face 4c of the collar 4 rearward in the direction of insertion. Note however, that the oil feed orifices 40 do not have to open to the end face 4c.

Figure 6A:
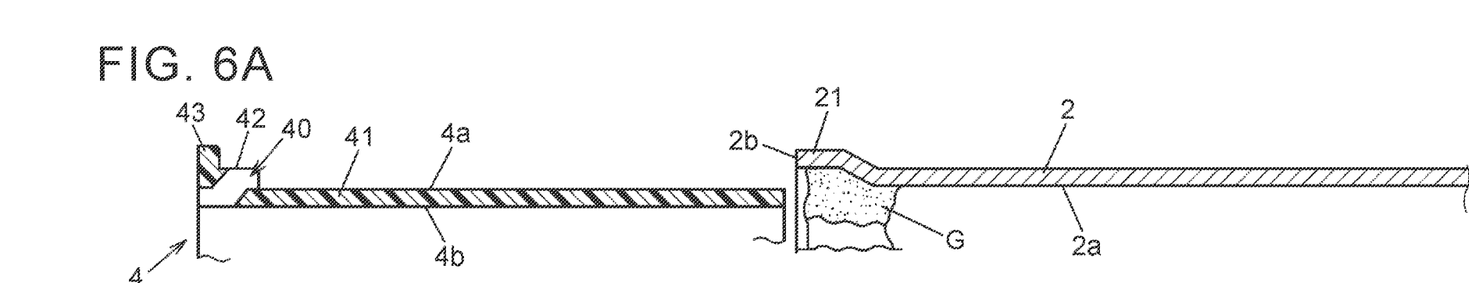
FIG. 6A is an explanatory diagram illustrating a manufacturing method of the steering column device.
Figure 6B:
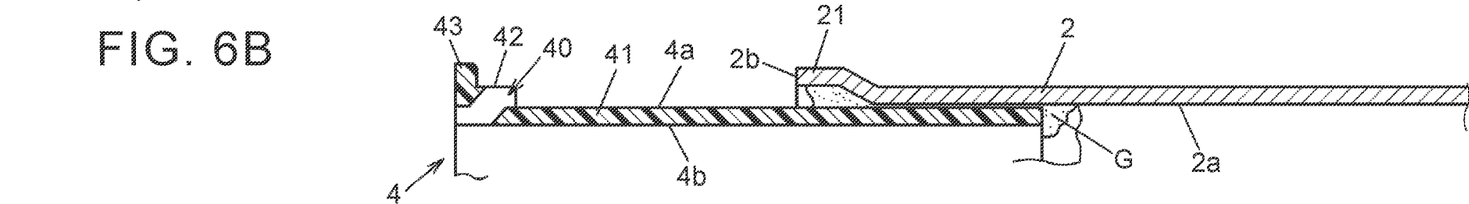
FIG. 6B is an explanatory diagram illustrating the manufacturing method of the steering column device.
Figure 6C:
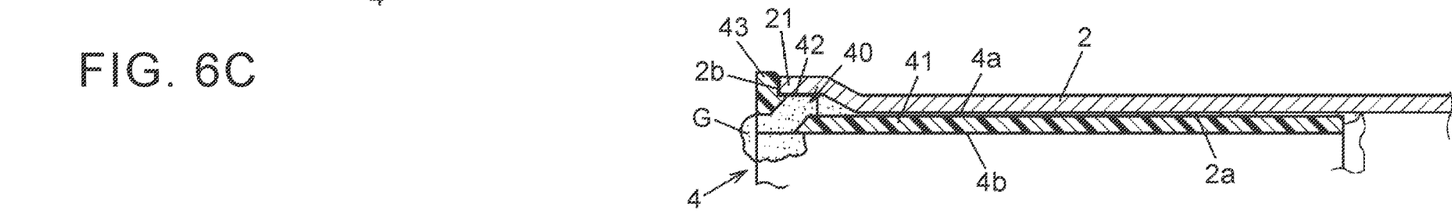
FIG. 6C is an explanatory diagram illustrating the manufacturing method of the steering column device.
Figure 6D:
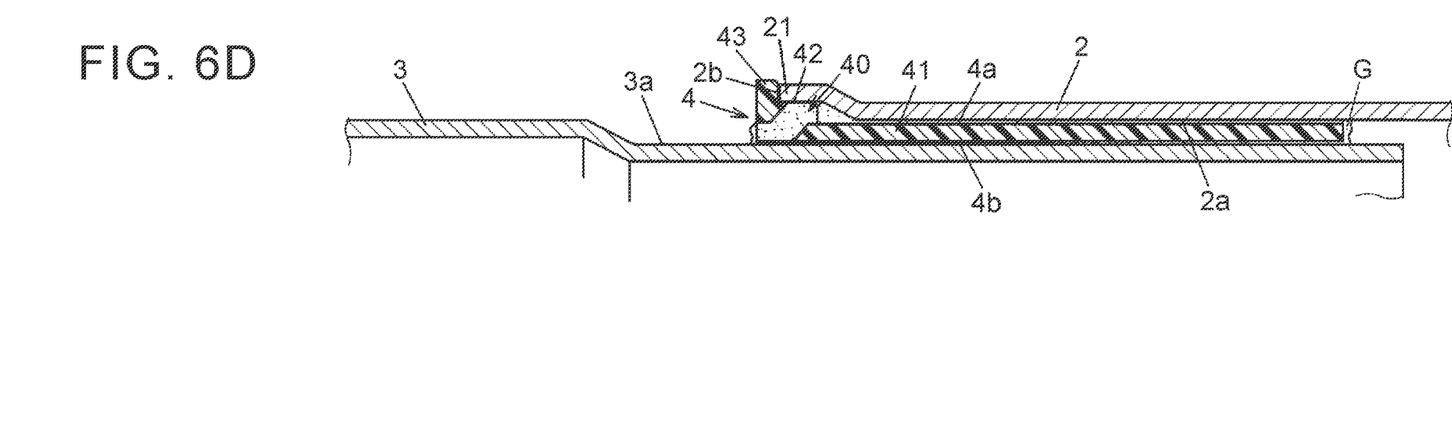
FIG. 6D is an explanatory diagram illustrating the manufacturing method of the steering column device.
Figure 7A:
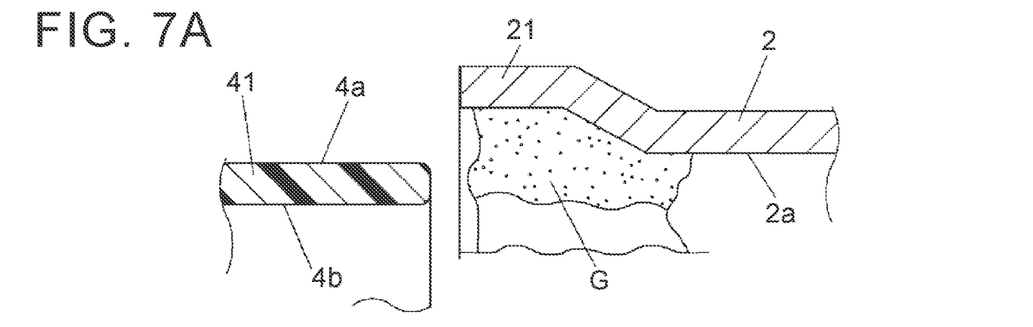
FIG. 7A is a partially-enlarged view of FIG. 6A.
Figure 7B:
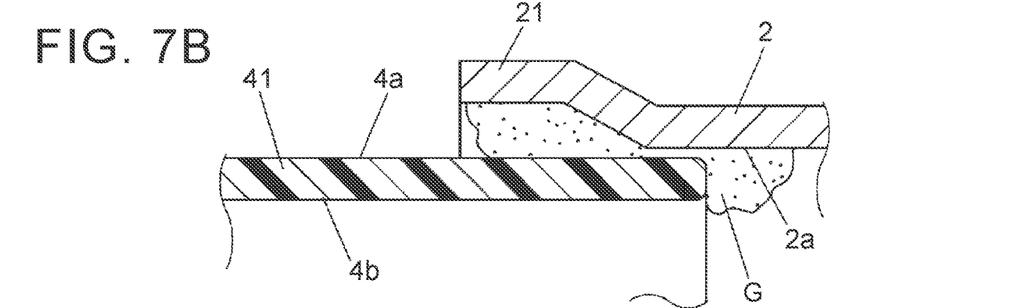
FIG. 7B is a partially-enlarged view of FIG. 6B.
Figure 7C:
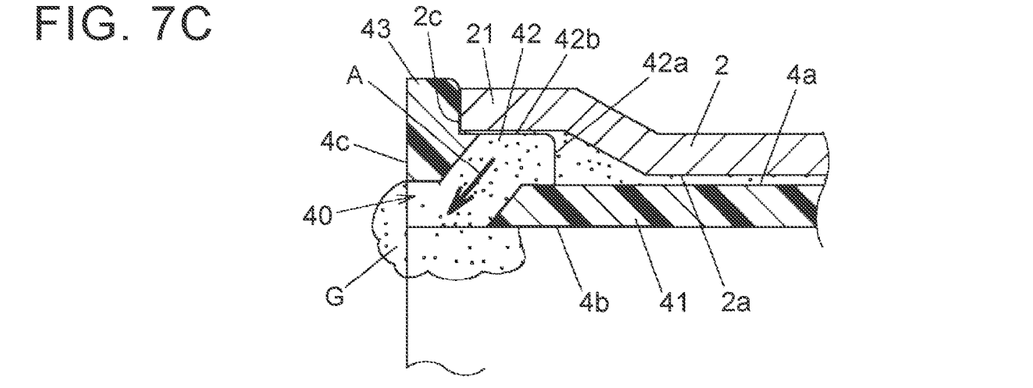
FIG. 7C is a partially-enlarged view of FIG. 6C.
Figure 7D:
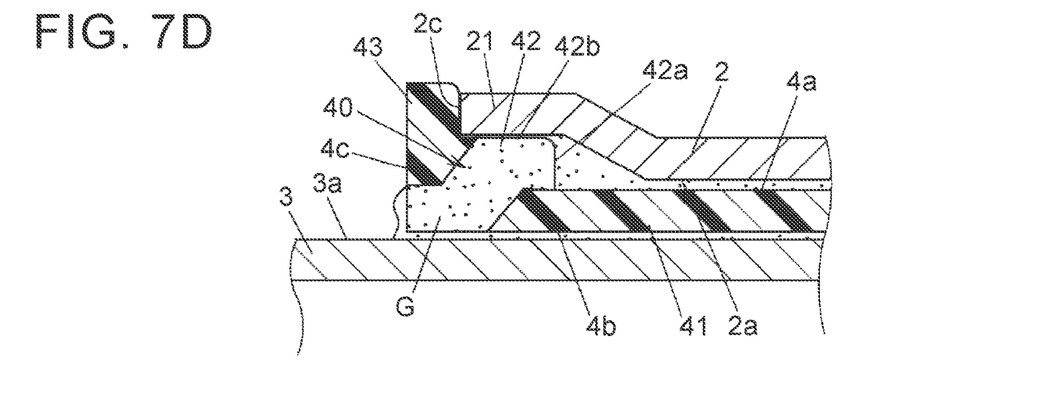
FIG. 7D is a partially-enlarged view of FIG. 6D.

The manufacturing method of the steering column device 1 includes a first process of coating the inner circumferential face 2a of the upper tube 2 or the outer circumferential face 4a of the collar 4 with the grease G, a second process of inserting the collar 4 into the upper tube 2, and a third process of inserting the lower tube 3 into the collar 4 inserted into the upper tube 2. FIGS. 6A and 7A illustrate the first process, and FIGS. 6B and 7B illustrate the second process. FIGS. 6C and 7C illustrate a state upon completion of the second process, and FIGS. 6D and 7D illustrate the third process. Note that the first process, the second process, and the third process are not performed in parallel. The second process is performed after completion of the first process, and the third process is performed after completion of the second process.

Although FIGS. 6A and 7A illustrate an arrangement in which the grease G is coated on the inner circumferential face 2a at the expanded portion 21 of the upper tube 2, the grease G may be coated on the outer circumferential face 4a of the collar 4, at the forward end portion in the direction of insertion. Also, although the grease G is preferably coated on the entirety of the circumferential direction of the inner circumferential face 2a of the upper tube 2 or the outer circumferential face 4a of the collar 4, the grease G may be coated on a plurality of positions in the circumferential direction.

In the second process, insertion of the collar 4 into the upper tube 2 causes the grease G to be disposed between the inner circumferential face 2a of the upper tube 2 and the outer circumferential face 4a of the collar 4. Also, when the annular protrusion 42 of the collar 4 is inserted to the inner side of the expanded portion 21 in the second process, part of the lubricating oil in the expanded portion 21 is guided from the outer circumferential face 4a side of the collar 4 to the inner circumferential face 4b side thereof via the oil feed orifices 40, as illustrated in FIGS. 6C and 7C.

In the third process, the semisolid lubricating oil guided from the outer circumferential face 4a of the collar 4 to the inner circumferential face 4b side in the second process comes to be disposed between the inner circumferential face 4b of the collar 4 and the outer circumferential face 3a of the lower tube 3 as the lower tube 3 is inserted to the inner side of the collar 4. Also, in the third process, the collar 4 is inserted into the upper tube 2 until the flange portion 43 abuts the end face 2b of the expanded portion 21, and the retaining claw 44 engages the engaging hole 200 of the upper tube 2 in this state.

Comparative Example

FIGS. 8A through 8E illustrate an upper tube 2A and a collar 4A according to a comparative example along with the lower tube 3. This upper tube 2A does not have the expanded portion 21 provided at the end portion, and the outer diameter and the inner diameter of the upper tube 2A are uniform over the entirety thereof in the axial direction. The collar 4A has a cylindrical main portion 41 in the same way as the collar 4 according to the above-described embodiment, but the oil feed orifices 40 are not formed at the rear end portion in the direction of insertion to the upper tube 2A, and an annular wall portion 45 that has a larger outer diameter than the main portion 41 is provided at this rear end portion.

Figures 8A, 8B:
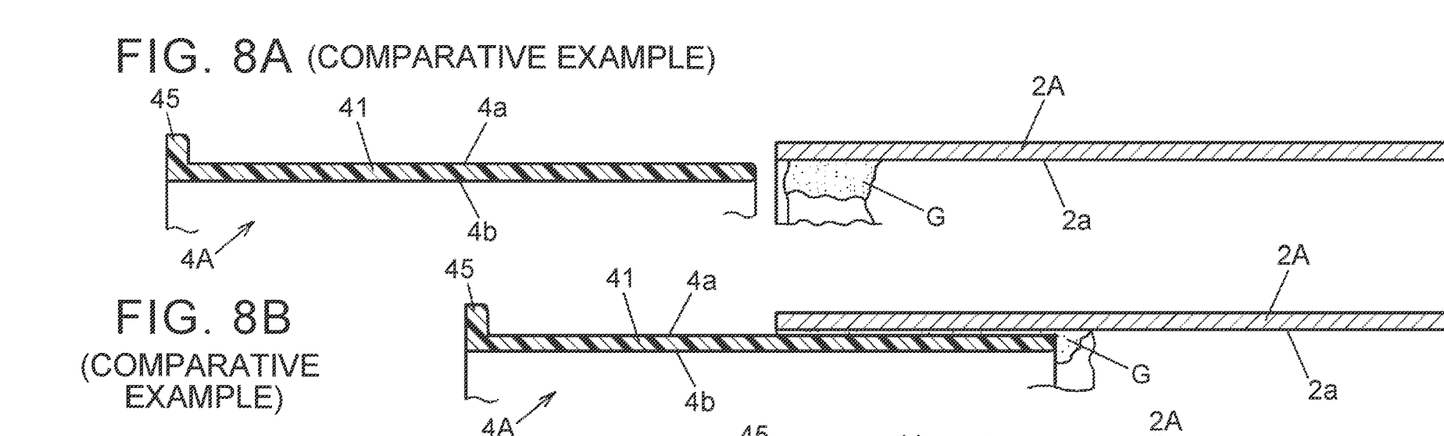
FIG. 8A is an explanatory diagram illustrating a manufacturing method of the steering column device according to a comparative example.
FIG. 8B is an explanatory diagram illustrating the manufacturing method of the steering column device according to the comparative example.
Figures 8C, 8D:
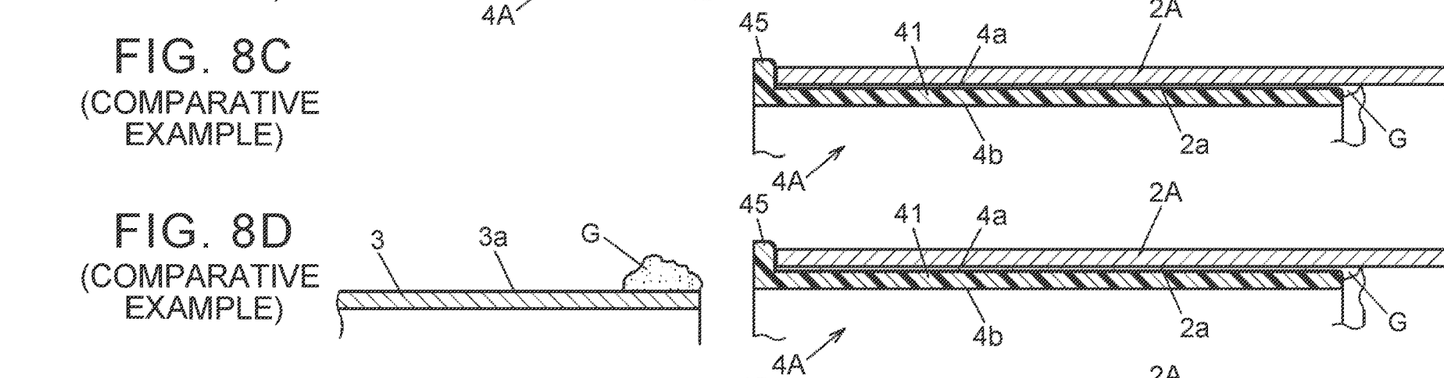
FIG. 8C is an explanatory diagram illustrating the manufacturing method of the steering column device according to the comparative example.
FIG. 8D is an explanatory diagram illustrating the manufacturing method of the steering column device according to the comparative example.

When assembling the collar 4A and the lower tube 3 to the upper tube 2A, the grease G is coated on the inner circumferential face 2a of the end portion of the upper tube 2A as illustrated in FIG. 8A, for example, and the collar 4A is inserted into the upper tube 2A as illustrated in FIGS. 8B and 8C. Accordingly, the grease G is disposed between the inner circumferential face 2a of the upper tube 2A and the outer circumferential face 4a of the main portion 41 of the collar 4A.

Figure 8E:
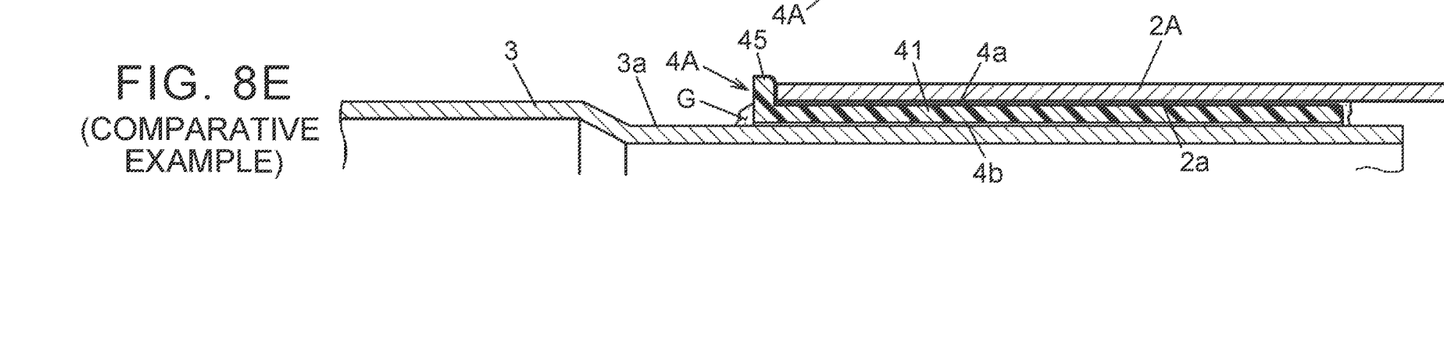
FIG. 8E is an explanatory diagram illustrating the manufacturing method of the steering column device according to the comparative example.

Thereafter, the grease G is coated on the outer circumferential face 3a of the lower tube 3 as illustrated in FIG. 8D, and the lower tube 3 is inserted into the collar 4A as illustrated in FIG. 8E. Accordingly, the grease G coated on the outer circumferential face 3a of the lower tube 3 is disposed between the inner circumferential face 4b of the collar 4A and the outer circumferential face 3a of the lower tube 3.

In this comparative example, a process of coating the outer circumferential face 3a of the lower tube 3 with the grease G becomes necessary, increasing the man-hours of work.

Advantages of Embodiment

According to the present embodiment described above, the oil feed orifices 40 are formed in the collar 4, and accordingly inserting the collar 4 into the upper tube 2 guides the grease G from the outer circumferential face 4a side to the inner circumferential face 4b side via the oil feed orifices 40. Thus, the grease G can be disposed between the inner circumferential face 4b of the collar 4 and the outer circumferential face 3a of the lower tube 3 without coating the grease G on the outer circumferential face 3a of the lower tube 3 as in the comparative example described above, for example, and the man-hours at the time of manufacturing can be reduced.

Also, the collar 4 has the annular protrusion 42 accommodated in the expanded portion 21 of the upper tube 2, and the oil feed orifices 40 open to the end face 42a of the annular protrusion 42 in the axial direction, whereby the grease G inside the expanded portion 21 is readily guided into the oil feed orifices 40. The oil feed orifices 40 also open to the outer circumferential face 42b of the annular protrusion 42, further facilitating introduction of the grease G to the oil feed orifices 40.

Also, the flange portion 43 is provided to the collar 4, and accordingly the grease G inside the expanded portion 21 can be suppressed from leaking out of the upper tube 2. Moreover, the oil feed orifices 40 are formed inclined as to the center axis of the upper tube 2, and accordingly the grease G smoothly flows from the outer circumferential face 4a side to the inner circumferential face 4b side.

Notes

Although the disclosure has been described based on an embodiment, this embodiment does not limit the disclosure according to the Claims. It should also be noted that not all combinations of features described in the embodiment are indispensable to means for solving the object of the disclosure.

Also, the disclosure may be carried out modified as appropriate, with part of the configurations omitted, or configurations added or substituted without departing from the essence thereof. For example, an arrangement is described in the above embodiment in which the collar 4 is fixed to the upper tube 2 and the inner circumferential face 4b of the collar 4 slides over the outer circumferential face 3a of the lower tube 3, but this is not limiting, and an arrangement may be made in which the collar 4 is fixed to the lower tube 3, and the inner circumferential face 2a of the upper tube 2 slides over the outer circumferential face 4a of the collar 4.

Although description is made in the above embodiment regarding an arrangement in which the steering column device 1 has the power-assisted steering device 9, the disclosure can be applied to a steering column device that does not have a power-assisted steering device, as well.

What is claimed is:

1. A steering column device for supporting a steering shaft such that the steering shaft is rotatable with respect to the steering column device, a steering wheel being linked to the steering shaft, the steering column device comprising:
   a metal outer-side cylindrical member that is relatively movable in an axial direction;
   a metal inner-side cylindrical member that is relatively movable in the axial direction; and
   a resin intermediate cylindrical member that is disposed between the outer-side cylindrical member and the inner-side cylindrical member, wherein
   a semisolid lubricating oil is disposed between an outer circumferential face of the intermediate cylindrical member and the outer-side cylindrical member, and between an inner circumferential face of the intermediate cylindrical member and the inner-side cylindrical member, and
   the intermediate cylindrical member has an oil feed orifice through which the semisolid lubricating oil is guided from an outer circumferential face side to an inner circumferential face side when inserting the intermediate cylindrical member into the outer-side cylindrical member.

2. The steering column device according to claim 1, wherein
   the intermediate cylindrical member has an annular protrusion at a rear end portion in a direction of insertion into the outer-side cylindrical member,
   the outer-side cylindrical member has an expanded portion that accommodates the annular protrusion, and
   the oil feed orifice opens to an end face of the annular protrusion at a far side of the expanded portion.

3. The steering column device according to claim 2, wherein
   the intermediate cylindrical member has a flange portion that has a larger outer diameter than the annular protrusion at the rear end portion in the direction of insertion, and
   the oil feed orifice opens to an outer circumferential face of the annular protrusion located further forward in the direction of insertion than the flange portion.

4. The steering column device according to claim 3, wherein at least part of the oil feed orifice is inclined as to a center axis of the outer-side cylindrical member such that at least a part of the oil feed orifice extends further rearward in the direction of insertion as the oil feed orifice becomes closer to the inner circumferential face side.

5. The steering column device according to claim 1, wherein
   at least part of the oil feed orifice is inclined as to a center axis of the outer-side cylindrical member such that at least a part of the oil feed orifice extends further rearward in a direction of insertion as the oil feed orifice becomes closer to the inner circumferential face side.

6. The steering column device according to claim 2, wherein
at least part of the oil feed orifice is inclined as to a center axis of the outer-side cylindrical member such that at least a part of the oil feed orifice extends further rearward in the direction of insertion as the oil feed orifice becomes closer to the inner circumferential face side.

7. A manufacturing method for the steering column device according to claim 1, the manufacturing method comprising:
a first process of coating the inner circumferential face of the outer-side cylindrical member or the outer circumferential face of the intermediate cylindrical member with the semisolid lubricating oil;
a second process of inserting the intermediate cylindrical member into the outer-side cylindrical member; and
a third process of inserting the inner-side cylindrical member into the inner side of the intermediate cylindrical member that is inserted into the outer-side cylindrical member, wherein the semisolid lubricating oil guided from the outer circumferential face side of the intermediate cylindrical member to the inner circumferential face side in the second process is disposed between the inner circumferential face of the intermediate cylindrical member and the inner-side cylindrical member in the third process.

* * * * *